INVENTOR:
Erwin E. Barischoff

By Smyth, Roston & Pavitt
ATTORNEYS

INVENTOR:
Erwin E. Barischoff

By Smyth, Roston & Pavitt
ATTORNEYS

United States Patent Office 3,373,425

Patented Mar. 12, 1968

3,373,425

TUNNEL DIODE CIRCUIT UTILIZED TO CONTROL THE REPLY OF A PASSIVE TRANSPONDER

Erwin E. Barischoff, Quartz Hill, Calif., assignor to Allen L. Well, Redondo Beach, Calif.

Filed Apr. 14, 1967, Ser. No. 631,003
7 Claims. (Cl. 343—6.8)

ABSTRACT OF THE DISCLOSURE

A passive transponder comprised of a disk with a dipole antenna and a rectifier with a storage type load for accumulating electrical energy; a resonant circuit is coupled intermittently to the store for oscillatory discharge thereof, the oscillations to be transmitted by the antenna.

The present invention relates to a transponder. Transponders are devices which operate in a manner that upon receiving a signal, particularly an electromagnetic wave, they automatically rebroadcast a reply. Transponders of this type usually require a power supply source, particularly for providing the energy that is needed for generating the rebroadcasted signal.

As long as such a transponder is installed in a manner which permits connection to an existing power source, or which permits utilization of a battery which can be checked frequently as to its preparedness, no basic problem exists with regard to operativeness other than normal maintenance. There is, however, a need for transponders which should reply to a signal upon receiving an interrogating signal, without requiring an auxiliary source of energy, for the simple reason that such an auxiliary source of energy is not readily available.

Consider for example a person lost in a desolated area or on the ocean. It is by no means certain that such person has available a battery or that the circumstances which put him into the distressed situation did not also destroy equipment rendering, for example, a battery or any other power source useless or at least damaging it severely. Consider also the case of objects which are installed at normally inaccessible locations and under circumstances which makes it possible that the location will be forgotten. Long periods of time may elapse until such object is needed again, and any battery may have in the meantime worn out.

It is, therefore, the principal object of the present invention to provide a transponder which operates without an auxiliary source of power, but which in a very efficient manner uses the incoming energy as particularly derived, for example, from an interrogating or search beam; such energy is temporarily stored until it has attained a suitable level, and then a rebroadcast signal is emitted by the transponder.

Therefore, it is a principal object of the present invention to provide a passive transponder whereby the term, passive, is used to indicate absence of a previously connected local power source.

In its preferred configuration the transponder is mounted on a dielectric disk bearing on one side a dipole antenna of suitable configuration; a pair of sector shaped antennas has been found highly suitable to be provided as platings on one side of the disk. A second important element of the inventive transponder is a resonant circuit, preferably a parallel resonant circuit, which is tuned to a particular frequency which is different from the frequency of the search beam expected to be received by the antenna. It has been found highly suitable from the standpoint of efficiency to employ for rebroadcasting the ultra high frequency range such as frequencies between 400 and 750 megacycles. The resonant circuit may comprise a semi-loop plating placed on the other side of the disk but not adjacent to the antenna sectors. A capacitor is connected across the semi-loop.

This tuned circuit is connected to the two sector shaped antennas by circuit elements which preferably are also plated onto the disk; in its preferred configuration the two ends of the resonant circuit respectively connect to two spirally shaped platings thus establishing two coils. These two coils are positioned respectively opposite to the antenna platings to thereby establish capacitive couplings to the dipoles of the antenna, and this in turn establishes two series resonant circuits, tuned to the same frequency to which the parallel tank circuit is being tuned, thus providing minimum resistance for oscillations passed from the tank circuit to the dipole antennas while rejecting other frequencies including those received by the dipole antenna.

The dielectric disk further carries a rectifier, preferably a full wave, bridge type rectifier, having two AC input terminals and two DC output terminals. The two AC input terminals are also connected to the dipole antenna for example by means of capacitors, each of which having a very low impedance in the range of the frequencies expected to be received by the antenna, while providing a rather high impedance in the range of the frequency of the tank circuit (UHF). A capacitor is connected across the two DC output terminals of the rectifier. Thus, this capacitor is being charged with whatever energy (excluding certatin losses) is being received by the two dipoles.

This storage capacitor connects to one end of the tank circuit directly and to the other end of the tank circuit by means of a switching element, preferably a tunnel diode. A tunnel diode produces very little switching noise. The operating range of a tunnel diode as it is usually used has two stable states, one being a low impedance state and one a high impedance state. For rather low voltages across the storage capacitor the tunnel diode is in the low impedance state, thus coupling the storage capacitor to the tank circuit and detuning the same while providing a rather low Q, so that the tank circuit by itself can set up only very low and highly damped oscillations.

Thus, and this is the low voltage case as far as the storage capacitor is concerned, very little energy is being lost until the storage capacitor has accumulated a predetermined amount of energy. After the voltage across the storage capacitor has reached a critical value the tunnel diode is shifted to the high impedance state, so that the tunnel diode effectively decouples the storage capacitor from the tank circuit thus improving the Q thereof and permitting same to oscillate at its natural or resonant frequency.

The tank circuit is decoupled from the capacitor during excursions of that polarity of the oscillation as set up by the tank circuit, when without decoupling energy would flow from the tank circuit back to the capacitor. The decoupling is overriden for excursions of oscillations of the tank circuit in the opposite direction, but during the periods of coupling there is a transfer of energy from the storage capacitor to the tank circuit. Thus, taking an oscillation cycle of the tank circuit as a whole, there is established a resonant circuit of high Q drawing its energy from the storage capacitor. Due to the high Q condition of the tank circuit, energy can leak off through the series coupling network to the dipole antenna and is being rebroadcasted as a reply message. Very little energy flows back into the rectifier.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

Figure 1:
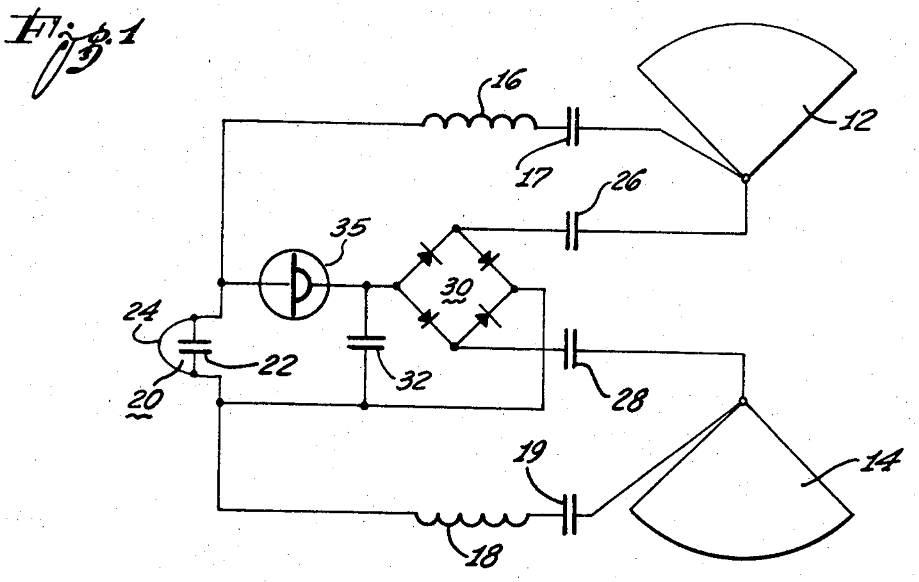
FIGURE 1 illustrates somewhat schematically a circuit diagram of a preferred embodiment of the transponder in accordance with the present invention.

Proceeding now to the detailed description of the drawing, there is shown a round, fiberglass disk 10 which by way of representative example may be 2 inches wide and ⅛ inch thick. This disk carries and supports all of the circuit elements that are necessary for operation of the inventive transponder.

One side of the disk 10 (FIGURE 2) is provided with two sector shaped plates 12 and 14, which in effect are established by thin silver coatings plated on one side of disk 10. These two sectors 12 and 14 are electrically insulated from each other and from the central area of the disk to form a true dipole antenna of large band width behavior. The other side of disk 10 (FIGURE 3), and respectively opposite to the two sectors 12 and 14, there are provided two plated coils 16 and 18. The plated coils 16 and 18 have a spiral configuration, and the width of each coil is selected to constitute a capacitance together with the respectively juxtaposed sectors 12 or 14, separated from the coil shaped plating by the dielectric material that forms the disk 10.

Figure 5:
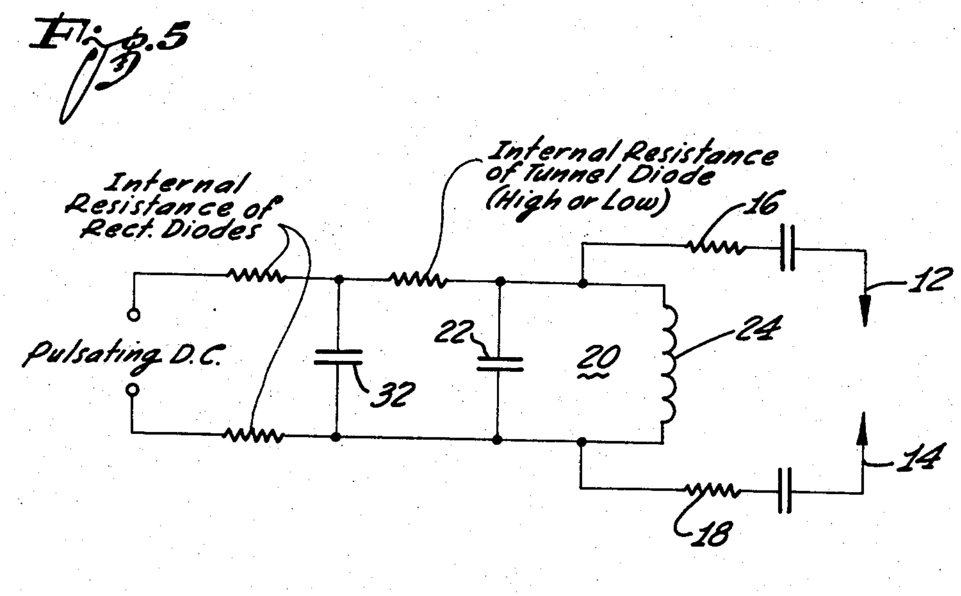
FIGURE 5 illustrates the equivalent circuit diagram of the circuit network of the inventive transponder.

Thus the two capacitors 17 and 19 as illustrated symbolically in FIGURES 1 and 5 are actually not separate individual components, but the plated elements 16 and 12 together by virtue of their specific location and mutual orientation form the capacitance 17, and, in a similar manner, plated elements 14 and 18 together form a capacitance 19 again solely by virtue of their particular positioning. The physical structure of the coils as they form the capacitances is selected to constitute two-series resonant circuits tuned at least approximately to similar frequencies. If we speak here of similar frequencies, we do not mean necessarily a precise coincidence of the resonant peaks but, it is understood, that a relatively wide overlap of the passing range or bands of these resonant circuits, when construed as filter, suffices.

Figure 3:
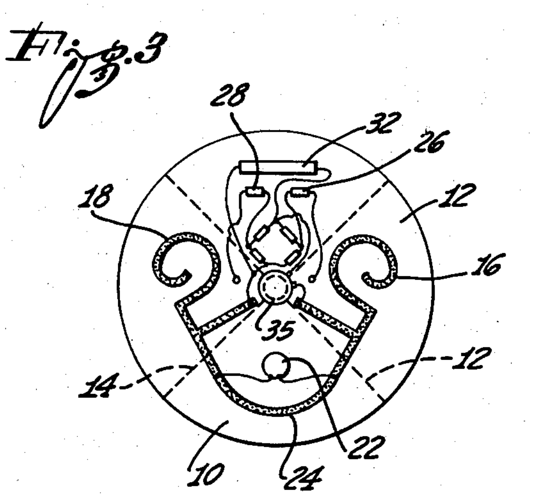
FIGURE 3 illustrates the side opposite to the one illustrated in FIGURE 2.

The frequency or band of the two series resonant circuits with the meaning given above is similar to the resonant frequency of a parallel resonant circuit 20, which is established by a capacitor 22 mounted on the disk 10 and by a curved plating 24 deposited on the disk 10 also on the same side which carries the platings which form the coils 16 and 18. More or less straight thin plating strips connect the two ends of the resonant circuit 20 to one end respectively of the two coils 16 and 18 (FIGURE 3). It can be seen that the respective other ends of the coils 16 and 18 thus terminate on the disk 10, as their flat structure provides for the capacitive coupling to sectors 12 and 14 and no further electrical connection is required.

Capacitors 26 and 28 respectively connect the apex type central area of sectors 12 and 14 to the AC input terminals of the bridge type rectifier 30 formed of four diodes in the usual manner. As the capacitors 26 and 28 are positioned on the side of disk 10 which is opposite to the one carrying dipole plates 12 and 14, these connections between dipoles and capacitors must traverse the disk which does not present any difficulties nor does it influence the circuit network in any detrimental manner, nor are stray capacitances set up by these connections.

The DC output terminals for this rectifier 30 connect directly and by means of simple wires to a relatively large storage capacitor 32. The junction between one DC pole of rectifier 30 and the capacitor 32 connects also directly to one of the terminals of the resonant circuit 20. The junction between the other DC output terminal of rectifier 30 and the respective other side of capacitor 32 is connected to the cathode of a tunnel diode 35, which has its respective other electrode (anode) connected to the terminal of resonant circuit which is not connected to capacitor 32.

Figure 2:
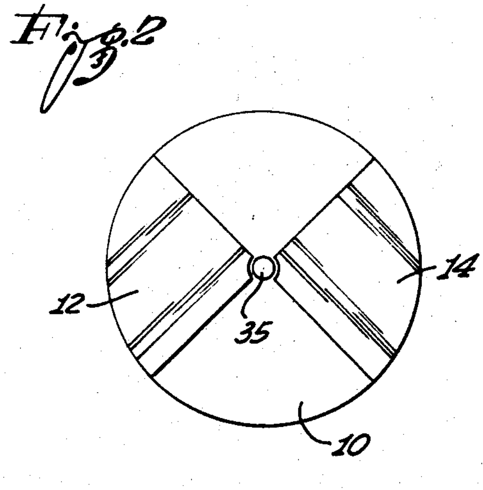
FIGURE 2 illustrates one side elevation of the transponder in accordance with the preferred embodiment.

One can see from FIGURES 2 and 3 that the tunnel diode 35 is located centrally. The location of diode 35 is basically a matter of mere structural convenience and ensures mechanical stability but is not an "electrical" necessity. However, in view of the nature of the circuit, the observation of overall symmetry is highly desirable in order to provide symmetrical coupling as between the sectors 12 and 14 on one hand and the remaining circuitry on the oher hand. Such symmetry will result in a narrowing of the band width of the signal as derived from resonant circuit 20 and to be broadcasted by the antenna. The symmetric structure necessarily reduces stray losses and prevents the establishing of unbalanced stray capacitances. It also prevents the setup of parasitic circuits.

The sectors 12 and 14 constitute a suitable antenna, basically of the dipole type as stated. The capacitors 26 and 28 are selected to have a relatively high impedance in the range of frequencies which includes the resonant frequency of the tank circuit 20 and the passing frequencies of circuits 16–17 and 18–19. This means that the capacitors 26 and 28 have a rather high capacitance; for example, they have a value in the order of $10^0$ picofarads. Thus, capacitors 26 and 28 offer a very low AC impedance in the so-called S band range which is used for radar communication and which has an order of magnitude of about $10^1$ gigacycles and higher.

In view of the fact the series resonant circuits 16 and 17, on one band, and 18 and 19, on the other hand, are in effect low-pass filters, they reject frequencies of the gigacycle range. Thus; radar frequency type pulses picked up by the sectors 12 and 14 are passed by this dipole antenna through the capacitors 26 and 28 to the rectifier 30.

It should be mentioned, that dipole antennas are usually employed in the UHF and VHF frequency regions and that for the S band the antenna design is to a considerable extent dictated by principles lent from the field of geometrical optics. However the transponder of the present invention should not have a high directional receiving characteristic, i.e., it should not offer narrow beam-type lobes. Furthermore, the inventive transponder should not, as far as the reception of energy is concerned, be restricted to any narrow band because utilization of the largest amount of energy available is very much of interest for the present invention. The principal object of the antenna is to offer a rather large metallic surface which intercepts a radar beam, and the interception will result in opposite electrical polarization of the two sector plates 12 and 14, accordingly resulting in a current flow into the rectifier 30.

Figure 4:
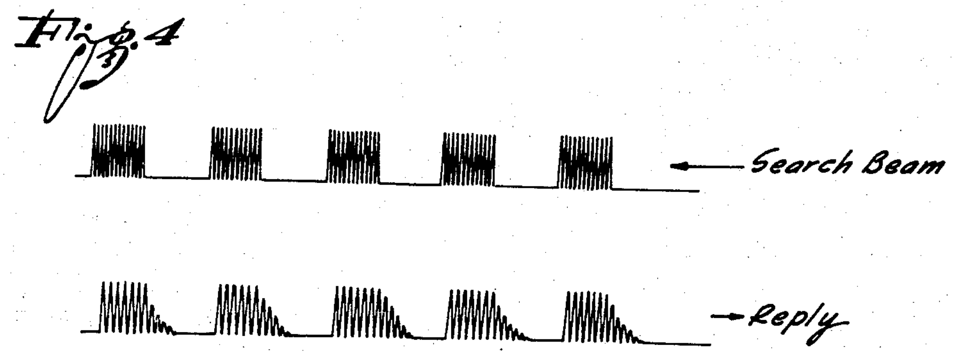
FIGURE 4 illustrates a sequence of interrogating pulses and of reply pulses as they are being used by and produced by the transponder in accordance with the present invention.

Assuming now that a radar pulse sequence, such as is illustrated in FIGURE 4, is broadcasted by and from a suitable transmitter station; for example 5 pulses following each other at the rate of about 1 microsecond and each pulses constituting a burst of gigacycle frequency signals. FIGURE 5 illustrates the equivalent circuit of the transponder circuit shown in FIGURE 1 and will be referred to in the following for purposes of explaining the operation of the inventive transponder. The internal resistance of the diodes of bridge 30, particularly in the very low voltage range, the resistance of the wire connections and the leakage resistance of the capacitor 32, offer an equivalent resistance in the diodes charging circuit for the capacitor, so that the accumulation of an electrical charge by capacitor 32 will not instantly follow the amplitude of the voltage which develops in the dipole antenna. Thus, for any radar pulse of the type illustrated, there will be some delay in the development of the charge of capacitor 32. If the radar signal as received by the antenna is too weak, the accumulated charge will never reach the level that the tunnel diode can be operated other than as a low impedance device. This will now explain in detail next.

Either in case of too low an input signal or during a certain period at the beginning of a radar pulse burst, particularly if the same is emitted by a station located rather remote from the transponder, the DC voltage developed across the capacitor 32 will be very low at first but rising. The effective resistance of the tunnel diode in this voltage range below breakthrough couples the capacitor 22 to the DC output terminals of the rectifier to receive some charge too. The polarity of the tunnel diode in relation to the output terminals of the rectifier should be noted, as only the forward region of the tunnel diode is employed here.

There is now an LC circuit set up by the inductance 24 and by the parallel circuit connection of capacitors 22 and 32, i.e., the tank circuit 20 is detuned by capacitor 32 when coupled to the tank circuit 20 via the low impedance diode 35. This LC circuit has a very low resonant frequency in comparison with the frequencies involved here in general; particularly the resonant frequency of the tank circuit 20 is larger by several orders of magnitude because capacitor 32 is much larger than capacitor 22. The resistance of diode 35 though low damps this particular LC circuit 24–22–32, to the extent that practically no oscillatory discharge of capacitor 32 may occur.

On the other hand the pulsating DC as applied by the antenna to capacitor 32 as a frequency which is high in comparison with the oscillation frequency of the LC circuit 24–22–32; furthermore the internal resistance of the tunnel diode 35 in the below-breakthrough region still has some decoupling effect as between the LC circuit 20 on one hand and the capacitor 32 on the other hand. Thus, the LC circuit 20 will be some extent be stimulated, but the oscillations are very damped due to discharge into capacitor 32. The oscillations of tank circuit 20 have the effect that at times the voltage of charging capacitor 32 is directly applied across the tunnel diode 35 and the capacitor 22 does not exclusively operate as a voltage reducing divider. However the resistance of the tunnel diode remains rather low, the effective Q of tank circuit 20 is very poor so that in effect the oscillations that are set up by tank circuit 20 have a very low amplitude, accordingly very little energy can bleed off through the series filters 16, 17 and 18, 19 to the antenna. Thus, there is a period of time during which the capacitor 32 effectively accumulates energy and practically no energy is being rebroadcasted.

If now the strength of the radar signals as picked up by the dipole antenna 12 and 14 increases and since the duration of each search pulse is longer than the inherent time constant established by the capacitance of capacitor 32 (as modified by capacitor 22) and the ohmic leakage resistances in the DC circuit as mentioned above, the accumulated voltage in capacitor 32 together with the instantaneous value of the voltage across capacitor 22 will at times reach a value which exceeds the breakthrough voltage of tunnel diode 35.

Looking at FIGURE 5 one can see that the resulting high resistance of tunnel diode 35 occurs at a polarity of the instantaneous voltage across capacitor 22 which is additive in relation to the existing voltage across capacitor 32, i.e., breakthrough will occur when the instantaneous voltage across capacitor 22 has a polarity which when added to the DC voltage then existing across capacitor 32 increases the total voltage as it is applied across the tunnel diode. This is a phase relationship as far as the voltage across capacitor 22 is concerned, during which at a low impedance of the tunnel diode energy flowed back from the tank circuit 20 into the capacitor 32, to thereby produce the low Q behavior of the tank circuit 20.

Now, at voltage values effective above the breakthrough value of tunnel diode 35 the higher effective resistance then assumed by the tunnel diode 35 effectively decouples the tank circuit 20 from the capacitor 32, and no such bleeding off of energy back into the capacitor 32 occurs. This decoupling occurs of course only during excursion of the voltage across tank circuit 20 in the one particular direction. For the excursions of the voltage across the capacitor 22 of opposite polarity with regard to the DC voltage across capacitor 32, the instantaneous impedance of tunnel diode 35 is lowered but this occurs during the phase during which there is an energy transfer from capacitor 32 to the tank circuit 20.

Thus looking at the total oscillating period of the oscillations of tank circuit 20, the tank circuit 20 will oscillate at a high Q with a continuous replenishing of any energy loss from the energy stored in capacitor 32. The resulting discharge of capacitor 32 will thus strongly stimulate tank circuit 20, and for each radar pulse received a burst of oscillations in the UHF range will be set up by tank circuit 20 to become effective across the dipole antenna. The tuned series circuits coupling the tank circuit to the dipole antenna offer minimum impedance and little loss.

The time between sequential radar pulses is, as stated, in the microsecond range. This is very long period in comparison with the oscillating period of the tank circuit 20. Oscillations of the tank circuit 20 may decay before the next radar pulse arrives to replenish the charge in capacitor 32. Accordingly, definite answering pulses are set up for each interrogating pulse which was effectively received by the transponder.

The resonant circuit 20 oscillates at a frequency which, for example, may be in the range between 400 and 750 megacycles. This is more than one magnitude below the incoming radar frequency signal. This way a strict separation of the bands is established. The capacitors 26 and 28 have a rather high impedance, as stated, for signals of the frequency of resonant circuit 20, so that very little energy flows back into rectifier 30, and most of the energy that bleeds off resonant circuit 20 will be emitted by the dipole antenna as a definite response of the transponder to the incoming radar beam.

The re-radiated energy will be replenished by the charge of the capacitor 32 as long as the voltage is above breakthrough within the rules given above. Thus each incoming radar pulse that was able to elevate the voltage across capacitor 32 above the level which permitted the breakthrough phenomenon to occur in tunnel diode 35, causes emission of rather short and fairly rapidly decaying pulses in the UHF range. The duration of each answer pulse is still rather long as compared with the individual oscillation period of the tank circuit 20.

The transition between a response and no response is by the transponder further aided and made definite by the fact that for low voltage signals the diodes of rectifier 30 offer high DC resistances, thus extending the time constant for the charging circuit of capacitor 32. As the strength of the incoming signal increases, the DC resistance in this charging circuit goes down, and the voltage as derived from the dipole antenna goes up, so that the relation between signal strength and voltage of capacitor 32 at the end of each pulses is high non-linear with rapidly increasing slope. This means that in case of a mobile station transmitting the search beam the response of the transponder will be a rather sudden one as the transmitter closes in on the transponder. This aids in the detection of the transponder response.

It can be seen that the system in accordance with the present invention is a very versatile one in that the detectable response by the transponder is the result of a cumulative effect from the reception of the broadcast signal from the transmitter station. As was stated above, the transponder of the type illustrated will be used for detecting the location or presence of a person or of an object, which person or object has by himself no other way of communicating or signaling his or its presence at a particular or unknown location. A radar transmitter-receiver system, for example, is mounted on an airplane flying a jungle area or above clouds or fog, and it will emit a search beam comprised of the radar pulses or pulse groups described with reference to FIGURE 4. The receiver of this mobile transceiver station will be tuned to the particular resonant frequency of the tank circuit of the transponder. As the beam hits the transponder, the latter will answer, and the answer will be detected. Due to the difference in frequencies the signal received by the receiver can readily be distinguished from any echo of the radar beam. If the radar search beam is narrowly focused, the direction of the transponder when responding to the beam can readily be ascertained. A phase shift between the searching pulse and the response pulse is indicative of the distance between the station and the transponder. In addition, the beginning of the transponder response to such a beam at a given direction is by itself indicative of the distance from the transponder. This, however, holds true only if the area of the transponder is very little influenced by any overall field of electromagnetic radiation coming from various sources, so that the capacitor 32 is actually fully discharged at the time the radar beam impinges upon the transponder. Any stray radiation may provide some bias for the capacitor. Furthermore if at a given distance the search pulse width is varied, too short a search pulse may not suffice to trigger any response by the transponder, while at a critical pulse width, the transponder does broadcast a detectable reply pulse. This width of the search beam pulse at which the first response occurs may also be used by itself as an indication of the distance of the station from the transponder.

It will be noted that no tuned circuit is provided at the input side of the transponder, i.e., in the antenna circuit. This is intentional because one wants the circuit to have a rather broad band input characteristics. The spectrum of radar pulse burst is rather wide, and one is desirous of having as little energy as possible lost in the circuit. The fact that the transponder may respond to spurious signals other than the particular search beam is immaterial as it is the actual reception of the transponder output frequency signal which is utilized. Furthermore a consistent response to a spurious signal broadcasted from other stations and consistently overshadowing the effect of the search beam is rather unlikely particularly if one considers the situation for which such transponder is to be used.

The invention is not limited to the embodiment described above, but all changes and modifications thereof not constituting departures from the spirit and scope of the invention are intended to be covered by the following claims.

What is claimed is:

1. A passive transponder, comprising:

antenna means, a rectifier coupled to said antenna means and having two DC output terminals;

a capacitor connected across said DC output terminals;

a resonant circuit connected to said antenna means; and voltage responsive means connected to said capacitor to detune said resonant circuit at a low Q for said resonant circuit and for a first range of voltages as effective across the voltage responsive means, and to substantially decouple the resonant circuit from the capacitor in a second range of voltages to permit said resonant circuit to develop signals at resonant frequency and at a high Q for passage to said antenna means.

2. A passive transponder, comprising:

antenna means, a rectifier coupled to said antenna means via impedance means having a very low impedance in the range of frequencies expected to be received by said antenna means;

energy storage means coupled to a rectifier to accumulate electrical energy as received by said antenna means to develop a DC voltage;

a resonant circuit oscillating at a frequency at which said impedance means has a relatively high impedance;

voltage responsive coupling means for coupling said resonant circuit to said storage means so that only after accumulation of a particular amount of energy in said storage means the resonant circuit is de-damped; and resonant frequency responsive coupling means for coupling said resonant circuit to said antenna means.

3. A passive transponder comprising:

UHF type antenna means;

first circuit means for providing a DC voltage in response to an AC voltage;

first coupling means for coupling said antenna means to said circuit means to permit passage of signals having a frequency within a particular range when being picked up by said antenna means, so that said circuit means develops a DC voltage in response thereto;

a resonant circuit having a resonant frequency outside of said particular range of frequencies;

second coupling means for connecting said first circuit means to said resonant circuit, to stimulate said resonant circuit provided a minimum amount of electrical energy has been received and passed to said circuit means; and third coupling means having passing behavior for said resonant frequency and rejecting behavior in said particular range, for coupling said resonant circuit to said antenna means.

4. A passive transponder, comprising:

a flat dielectric disk;

a pair of platings on one side of said disk to define thereon a dipole antenna;

a pair of spiral, coil shaped platings on the other side of said disk respectively capacitively coupled to said dipole antenna defining platings, to form two series resonant circuits having substantially similar resonant frequencies;

a parallel resonant circuit of like resonant frequency coupled to said two coils; and means coupled to said antenna to stimulate said parallel resonant circuit from energy received by said antenna at a frequency different from said resonant frequency.

5. A transponder as set forth in claim 4 said last mentioned means including a rectifier and signal blocking means for coupling the rectifier to the antenna while blocking the transfer of signals having said resonant frequency to said rectifier, further including a capacitor connected across the rectifier and with one side to one end of said parallel resonant circuit, and a tunnel diode for connecting the other side of the capacitor to the other end of said parallel resonant circuit.

6. In an apparatus of the character described, a bridge type rectifier having DC output terminals;

a capacitor connected across said DC output terminals;

a tunnel diode connected with its cathode to the negative output terminal of the rectifier; and a UHF frequency tank circuit connected to the anode of said tunnel diode and to the positive terminal of said rectifier, said capacitor having value which if regarded as connected in parallel to said tank circuit detuning said tank circuit over several orders of magnitude towards lower frequencies.

7. A passive transponder comprising:

a dipole antenna;

circuit means connected to said dipole antenna to produce a DC voltage in response to radio frequency signals received by said dipole antenna;

a tuned resonant circuit connected to said dipole antenna;

means connected to said antenna and said resonant circuit for preventing signals other than the resonant frequency if received by said dipole antenna from passing into the resonant circuit and preventing the passage of resonant frequency signals into said circuit means; and non-linear circuit means with threshold behavior connecting said circuit means to said resonant circuit to provide high damping for said resonant circuit in a first range of DC voltages as developed by said circuit means and to provide very low damping for a second range of DC voltages as developed by said circuit means.

References Cited

UNITED STATES PATENTS 3,299,424 1/1967 Vinding ---------- 343—6.8 XR

RODNEY D. BENNETT, *Primary Examiner.*

M. F. HUBLER, *Assistant Examiner.*